(12) United States Patent
Wiese et al.

(10) Patent No.: US 6,404,830 B2
(45) Date of Patent: Jun. 11, 2002

(54) DIGITAL RADIO FREQUENCY INTERFERENCE CANCELLER

(75) Inventors: Brian R. Wiese, San Carlos; John A. C. Bingham, Palo Alto, both of CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/864,765

(22) Filed: May 24, 2001

Related U.S. Application Data

(62) Division of application No. 08/834,503, filed on Apr. 4, 1997, now Pat. No. 6,014,412.
(60) Provisional application No. 60/016,251, filed on Apr. 19, 1996, and provisional application No. 60/016,252, filed on Apr. 19, 1996.

(51) Int. Cl.[7] ............................. H04L 25/08; H04L 1/00; H04L 25/03; H04L 25/49; H04B 1/10
(52) U.S. Cl. ........................................ 375/346; 375/296
(58) Field of Search ................................ 375/346, 206, 375/296

(56) References Cited

U.S. PATENT DOCUMENTS

| | | | | |
|---|---|---|---|---|
| 5,285,474 A | * | 2/1994 | Chow et al. ................. | 375/231 |
| 5,430,894 A | * | 7/1995 | Nohara et al. ............... | 455/296 |
| 5,479,168 A | * | 12/1995 | Johnson et al. ............. | 341/110 |
| 5,521,937 A | * | 5/1996 | Kondo et al. ................ | 375/206 |
| 5,596,600 A | * | 1/1997 | Dimos et al. ................ | 375/206 |
| 5,636,246 A | * | 6/1997 | Tzannes et al. ............. | 375/260 |
| 5,887,032 A | * | 3/1999 | Cioffi .......................... | 375/257 |

* cited by examiner

Primary Examiner—Chi Pham
Assistant Examiner—Tony Al-Beshrawi
(74) Attorney, Agent, or Firm—Pedro P. Hernandez; W. James Brady, III; Frederick J. Telecky, Jr.

(57) ABSTRACT

Disclosed are radio frequency (RF) interference cancellation techniques that effectively estimate RF interference to the data signals being received using a frequency domain model, and then remove the estimated RF interference from the received data signals. Improved techniques for digitally filtering multicarrier modulation samples to reduce sidelobe interference due to the RF interference are also disclosed.

18 Claims, 6 Drawing Sheets

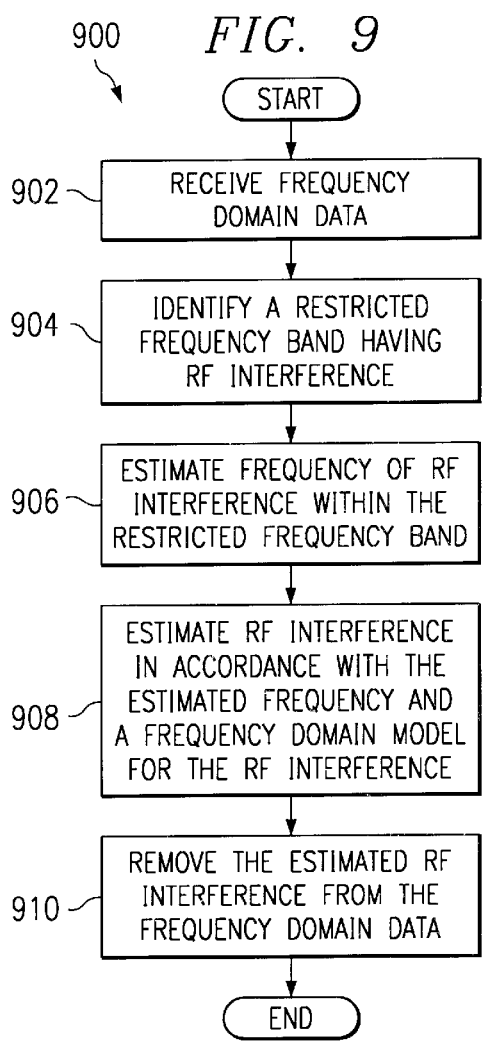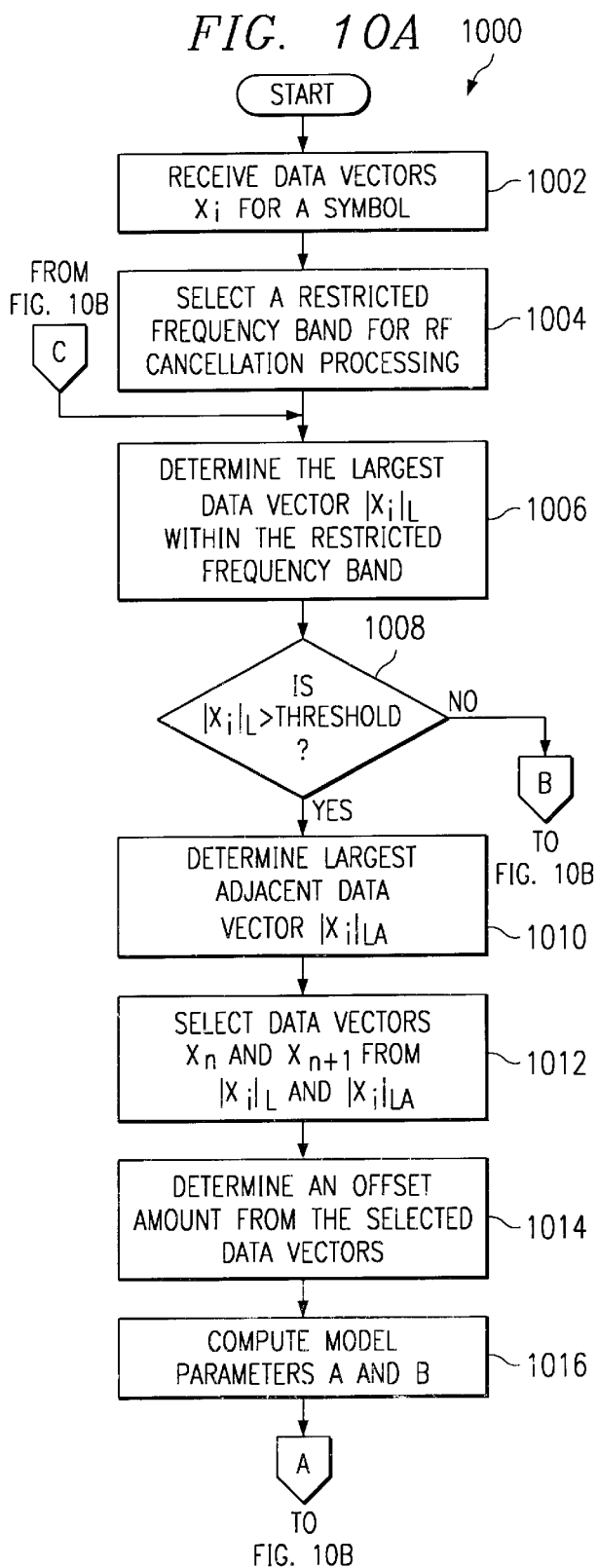

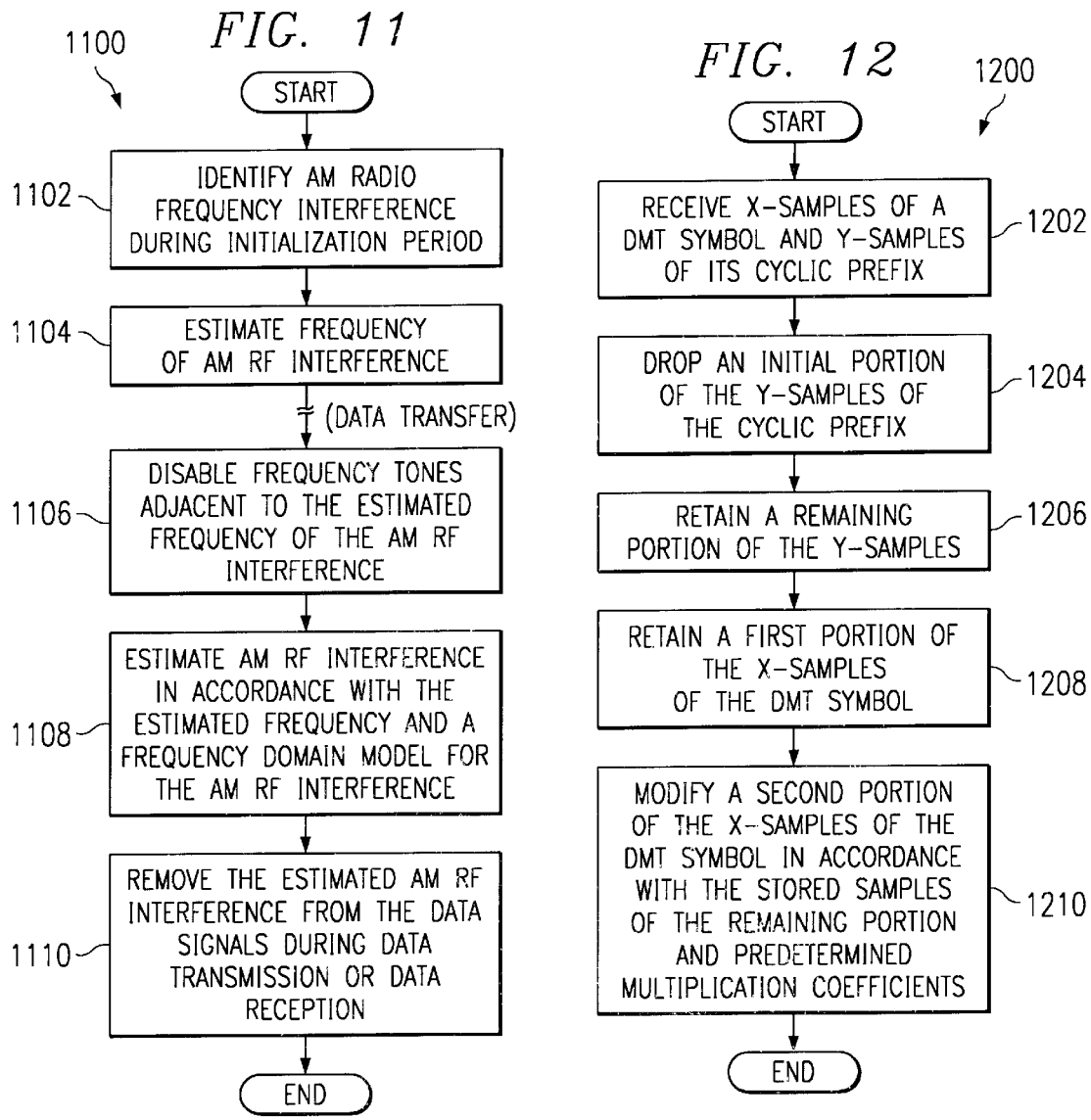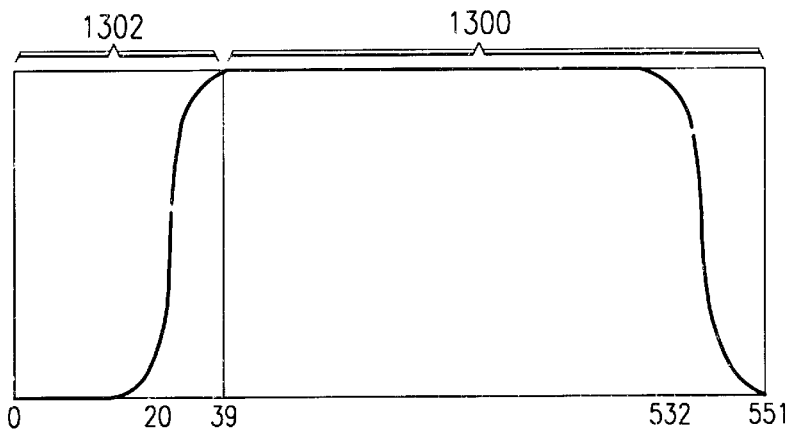
FIG. 13

DIGITAL RADIO FREQUENCY INTERFERENCE CANCELLER

CROSS-REFERENCE TO RELATED APPLICATIONS

This application is a divisional of U.S. Patent Application No. 08/834,503, filed Apr. 4, 1997, U.S. Pat. No. 6,014,412, and claims the benefit of Provisional Patent Application No. 60/016,251, filed Apr. 19, 1996, and Provisional Patent Application No. 60/016,252, filed Apr. 19, 1996, all of which are hereby incorporated by reference. Further, this application is related to U.S. Application No. 08/835,073 by Cioffi et al., filed Apr. 4, 1997, entitled "Radio Frequency Noise Canceller, " and U.S. Application No. 08/834,500 by Bingham et al., filed Apr. 4, 1997, entitled "Mitigating Radio Frequency Interference in Discrete Multicarrier Transmissions Systems, " both of which are hereby incorporated by reference.

BACKGROUND OF THE INVENTION

1. Field of the Invention

The present invention relates to radio frequency (RF) interference cancellation, and more particularly, to RF interference cancellation in multicarrier transmission systems.

2. Description of the Related Art

Bi-directional digital data transmission systems are presently being developed for high-speed data communication. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Speed Digital Subscriber Lines (VDSL).

The Alliance For Telecommunications Information Solutions (ATIS), which is a group accredited by the ANSI (American National Standard Institute) Standard Group, has finalized a discrete multi tone based approach for the transmission of digital data over ADSL. The standard is intended primarily for transmitting video data and fast Internet access over ordinary telephone lines, although it may be used in a variety of other applications as well. The North American Standard is referred to as the ANSI T1.413 ADSL Standard (hereinafter ADSL standard). Transmission rates under the ADSL standard are intended to facilitate the transmission of information at rates of up to 8 million bits per second (Mbits/s) over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied. However when modulation is performed efficiently using an inverse fast Fourier transform (IFF), typical values for the number of available sub-channels (tones) are integer powers of two, as for example, 128, 256, 512, 1024 or 2048 sub-channels.

The ADSL standard also defines the use of a reverse signal at a data rate in the range of 16 to 800 Kbit/s. The reverse signal corresponds to transmission in an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least 12.98 Mbit/s and up to 51.92 Mbit/s or greater in the downstream direction. To achieve these rates, the transmission distance over twisted-pair phone lines must Generally be shorter than the lengths permitted using ADSL. Simultaneously, the Digital, Audio and Video Council (DAVIC) is working on a similar system, which is referred to as Fiber To The Curb (FTTC). The transmission medium from the "curb" to the customer premise is standard unshielded twisted-pair (UTP) telephone lines.

A number of modulation schemes have been proposed for use in the VDSL and FTTC standards (hereinafter VDSL/FITC). Most of the proposed VDSL/FITC modulation schemes utilize frequency division duplexing of the upstream and downstream signals. Another promising proposed VDSL/FITC modulation scheme uses periodic synchronized upstream and downstream communication periods that do not overlap with one another. That is, the upstream and downstream communication periods for all of the wires that share a binder are synchronized. With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods. For example, with a 20-symbol superframe, two of the DMT symbols in the superframe are silent (i.e., quite period) for the purpose of facilitating the reversal of transmission direction on the phone line. In such a case, reversals in transmission direction will occur at a rate of about 4000 per second. For example, quiet periods of about 10–25 $\mu s$ have been proposed. The synchronized approach can be used a wide variety of modulation schemes, including multi-carrier transmission schemes such as Discrete Multi-Tone modulation (DMT) or Discrete Wavelet Multi-Tone modulation (DNVMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation. When the synchronized time division duplexed approach is used with DMT it is referred to as synchronized DMT (SDMT).

A common feature of the above-mentioned transmission systems is that twisted-pair phone lines are used as at least a part of the transmission medium that connects a central office (e.g., telephone company) to users (e.g., residence). It is difficult to avoid twisted-pair wiring from all parts of the interconnecting transmission medium. Even though fiber optics may be available from a central office to the curb near a user's residence, twisted-pair phone lines are used to bring in the signals from the curb into the user's home or business.

Although the twisting of the twisted-pair phone lines provides some protection against external radio interference, some radio interference is still present. As the frequency of transmission increases, the radio interference that is not mitigated by the twisting becomes substantial. As a result, the data signals being transmitted over the twisted-pair phone lines at high speeds can be significantly degraded by the radio interference. As the speed of the data transmission increases, the problem worsens. For example, in the case of VDSL signals being transmitted over the twisted-pair phone lines, the radio interference can cause significant degradation of the VDSL signals. This problematic radio interference is also referred to as radio frequency noise.

The undesired radio interference can come from a variety of sources. One particular source of radio interference is amateur (or ham) radio operators. Amateur radios broadcast over a wide range of frequencies with significant amount of power. The amateur radio operators also tend to change their broadcast frequency quite often, for example, about every two minutes. Another source of radio interference is AM radio transmissions by radio stations which broadcast over a wide range of frequencies. With high speed data transmission, the radio interference (noise) produced by various sources can significantly degrade the desired data signals being transmitted over twisted-pair phone lines.

Consequently, the problem with using twisted-pair phone lines with high frequency data transmission rates, such as available with ADSL and VDSL, is that radio interference becomes a substantial impediment to a receiver being able to be properly receive transmitted data signals. Thus, there is a need to provide techniques to eliminate or compensate for radio interference.

SUMMARY OF THE INVENTION

Broadly speaking, the invention pertains to radio frequency (RF) interference cancellation techniques that effectively estimate RF interference to transmitted data signals being received using a frequency domain model for the RF interference, and then remove the estimated RF interference from the received data signals. The invention also pertains to improved techniques for digitally filtering multicarrier modulation samples to reduce sidelobe interference due to the RF interference.

The invention can be implemented in numerous ways, including as an apparatus, system, method, or computer readable media. Several embodiments of the invention are discussed below.

As a method for mitigating radio frequency (RF) interference in a multicarrier modulation system, one embodiment of the invention includes the operations of: obtaining frequency domain data associated with a frequency band; identifying a restricted frequency sub-band within the frequency band; estimating a frequency of the RF interference within the restricted frequency sub-band; estimating the RF interference in accordance with a frequency domain model for the RF interference and the estimated frequency of the RF interference; and thereafter removing the estimated RF interference from the frequency domain data.

As a method for mitigating radio frequency interference in a multicarrier modulation system, another embodiment of the invention includes the operations of: identifying AM radio interference to the multicarrier modulation system, estimating a frequency of the AM radio interference, and disabling certain frequency tones of the multicarrier modulation system adjacent to the estimated frequency of the AM radio interference from carrying data during the data transmission, these operations occur prior to data transmission. Thereafter, during or following data reception, the invention also includes the operations of estimating the AM radio interference in accordance with a frequency domain model for the AM radio interference and the estimated frequency of the AM radio interference, and removing the estimated AIM radio interference from the frequency domain data on those of the frequency tones of the multicarrier modulation system that carry data.

As a method for digitally filtering multicarrier modulation samples to reduce sidelobe interference from a radio frequency (RF) interferer, the multicarrier modulation samples occur at predetermined frequency tones and form a multicarrier modulation symbol, an embodiment of the invention includes the operations of: receiving x samples of a multicarrier modulation symbol and y samples of a cyclic prefix associated with the multicarrier modulation symbol, the y samples of the cyclic prefix preceding the x samples of the multicarrier modulation symbol; discarding an initial portion of the y samples of the cyclic prefix associated with the multicarrier modulation symbol; storing a remaining portion of the y samples of the cyclic prefix associated with the multicarrier modulation symbol; retaining a first portion of the x samples of the multicarrier modulation symbol without modification; and modifying a second portion of the x samples of the multicarrier modulation symbol in accordance with the stored samples of the remaining portion of the y samples of the cyclic prefix and predetermined multiplication coefficients.

As a receiver for a multicarrier modulation system, an embodiment of the invention includes: an analog-to-digital (AID) converter, a multicarrier demodulator operatively connected to the AID converter, and a digital RF interference canceller operatively coupled to the multicarrier demodulator. The A/D converter receives analog signals that have been transmitted to the receiver over a transmission media and converts the analog signals to digital time domain signals. The multicarrier demodulator receives the digital time domain signals and converts the digital time domain signals into digital frequency domain data. The digital RF interference canceller mitigates the effect of RF interference on the digital frequency domain data by modeling the RF interference in accordance with a frequency domain model. Preferably, the digital time domain signals include a plurality of multicarrier modulation symbols carrying data, with each of the symbols also including a guard band, and the receiver further includes a cyclic prefix removal and windowing processor operatively connected between the A/D converter and the multicarrier demodulator. The cyclic prefix removal and windowing processor performs a time domain windowing operation on the symbols.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 9 is a diagram of basic radio frequency (RF) cancellation processing according to a basic embodiment of the invention;

FIGS. 10A and 10B are flow diagrams of digital RF cancellation processing according to an embodiment of the invention;

FIG. 11 is a flow diagram of AM radio frequency (RF) cancellation processing according to an embodiment of the invention;

FIG. 12 is a flow diagram of prefix removal and windowing processing according to an embodiment of the invention; and FIG. 13 is a diagram illustrating a 512 sample DMT symbol 1300 with a 40 sample prefix 1302, and a non-rectangular, extended window.

DETAILED DESCRIPTION OF THE INVENTION

In a multicarrier modulation system using wideband multicarrier modulation, radio frequency (RF) interference can often prevent proper reception of data transmitted by the multicarrier modulation system. The invention provides improved techniques for cancelling RF interference, particularly from narrowband interferers, from the data transmitted by the multicarrier modulation system. More particularly, the invention pertains to radio frequency (RF) interference cancellation techniques that effectively estimate RF interference to transmitted data signals being received using a frequency domain model, and then remove the estimated RF interference from the received data signals. The invention also pertains to improved techniques for digitally filtering multicarrier modulation samples to reduce sidelobe interference due to the RF interference.

Embodiments of the invention are discussed below with reference to FIGS. 1–12. However, those skilled in the art will readily appreciate that the detailed description given herein with respect to these figures is for explanatory purposes as the invention extends beyond these limited embodiments.

Figure 1:
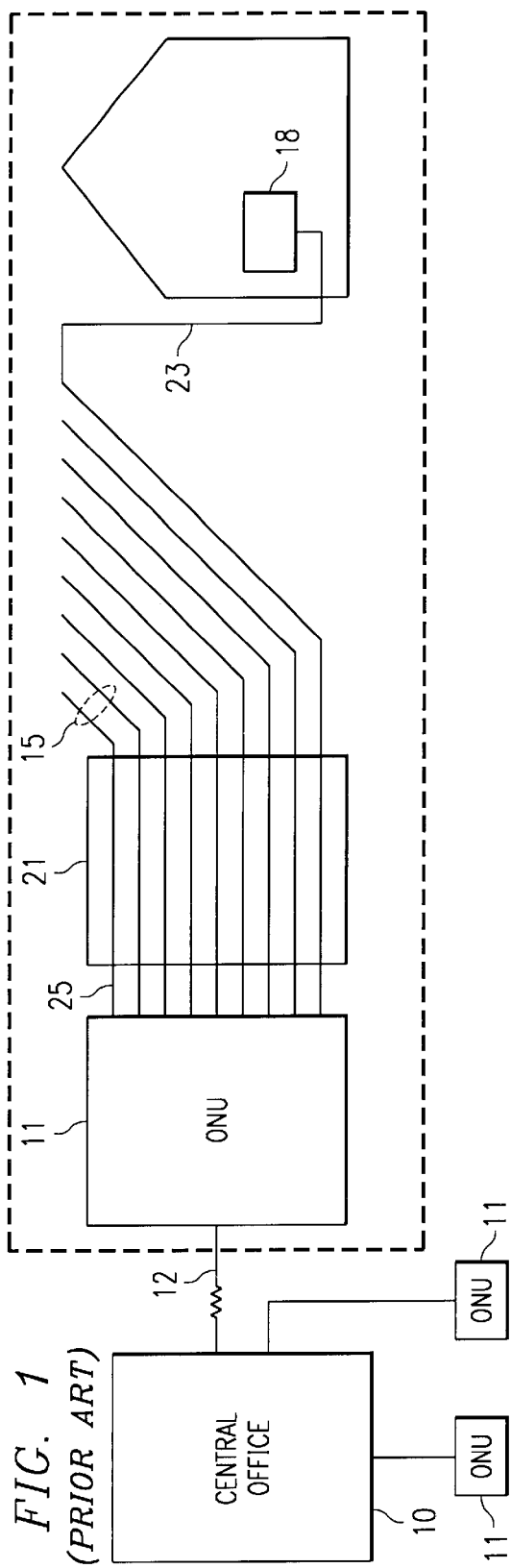
FIG. 1 is a block diagram of a representative telecommunications system suitable for using the invention.

FIG. 1 is a block diagram of representative telecommunications system suitable for using the invention. The telecommunications system represents portions of a typical wired telecommunications system that is suitable for the VDSL and FTTC (hereinafter VDSL/FTTC) applications. The system includes a central office 10 that services a plurality of distribution posts which may take the form of optical network units (ONUs) 11. Each distribution post communicates with the central office 10 over one or more high speed, multiplexed transmission lines 12 (e.g., a fiber optic line). The ONU 11 typically serves a multiplicity of discrete subscriber lines 15. Each subscriber line 15 typically services a single end user that is located within 1.5 kilometers of the ONU 11. The end user would have a remote unit 18 suitable for communicating with the ONU 11 at very high data rates. The remote unit 18 includes a modem but may take the form of a variety of different devices, as for example, a telephone, a television, a monitor, a computer, a conferencing unit, etc. Of course, it is possible that the end user may have a plurality of phones or other remote units 18 wired to a single line. The subscriber lines 15 serviced by a single ONU typically leave the ONU 11 in a shielded binder 21. The shielding in the binder generally serves as a good insulator against the emission (egress) and reception (ingress) of RF noise. However, the last segment of this subscriber line, commonly referred to as a "drop" 23 branches off from the binder and is coupled directly or indirectly to the end user's remote unit 18. This "drop" 23 portion of the subscriber line 15 between the remote unit 18 and the binder 21 is typically unshielded. In most applications the length of the "drop" is not more than about 30 meters. However, the unshielded wire of the "drop" 23 effectively acts as an antenna that both emits and receives RF signals. Additionally, there is some concern that the connection 25 between the ONU 11 and the twisted-pair subscriber lines 15 may also serve both as an RF energy emission source and as the receptor of RF energy.

Figure 2:
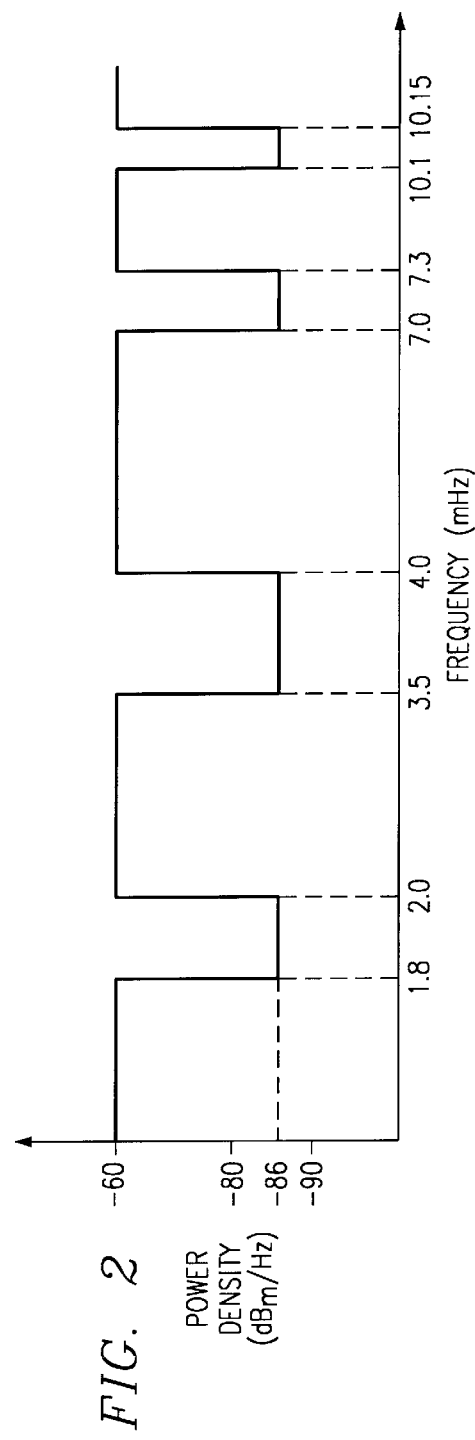
FIG. 2 is a graph illustrating a proposed transmission power spectral density for VDSL/FTTC upstream communications.

The amount of energy that a particular communication system may transmit is regulated by both governmental and practical considerations. As indicated above, in discrete multi-tone systems suitable for use in the VDSL/FTTC applications, frequency bands on the order 12 MHz are being contemplated. Within that 12 MHz frequency range, there are several narrow bands that are allocated to amateur radio users. Thus, one proposed transmission power spectral density for VDSL/FTTC upstream communications is illustrated in FIG. 2. In this embodiment the transmit power mask permits a maximum of −60 dBm/Hz throughout the majority of the frequency band. However, in selected frequency bands where amateur radio RF interference is expected (i.e., 1.8 to 2.0 MHz, 3.5 to 4.0 MHz, 7.0 to 7.3 MHz, and 10.1 to 10.15 MHz) transmissions are limited to significantly lower levels. The permissible output power level in these restricted frequency bands varies somewhat between proposals. However, most parties to the VDSL/FTTC standardization process have proposed maximum power densities in the range of approximately −70 dBm/Hz to −85 dBm/Hz. Regardless of the actual transmission power that is eventually agreed upon, it is clear that a conscious effort needs to be made to minimize emissions in the prohibited ranges.

A number of multi-carrier modulation schemes have been proposed for use in the VDSL and FTTC standards (hereinafter VDSL/FTTC). One proposed multi-carrier solution utilizes discrete multi-tone signals in a system that is similar in nature to the ADSL standard. Other proposed modulation schemes include carrierless amplitude and phase modulated (CAP) signals and discrete wavelet multi-tone modulation (DWMT). In order to achieve the data rates required by VDSL/FTTC, the transmission bandwidth must be significantly broader than the bandwidth contemplated by the ADSL. By way of example, the discrete multi-tone system adopted for ADSL applications utilizes a transmission bandwidth on the order of 1.1 MHz, while bandwidths on the order of 12 MHz are being contemplated for VDSL/FTTC applications. In one proposed DMT system for VDSL/FTTC applications, the use of 256 "tones" or "subchannels" that are each 43.125 kHz wide is contemplated.

Figure 3:
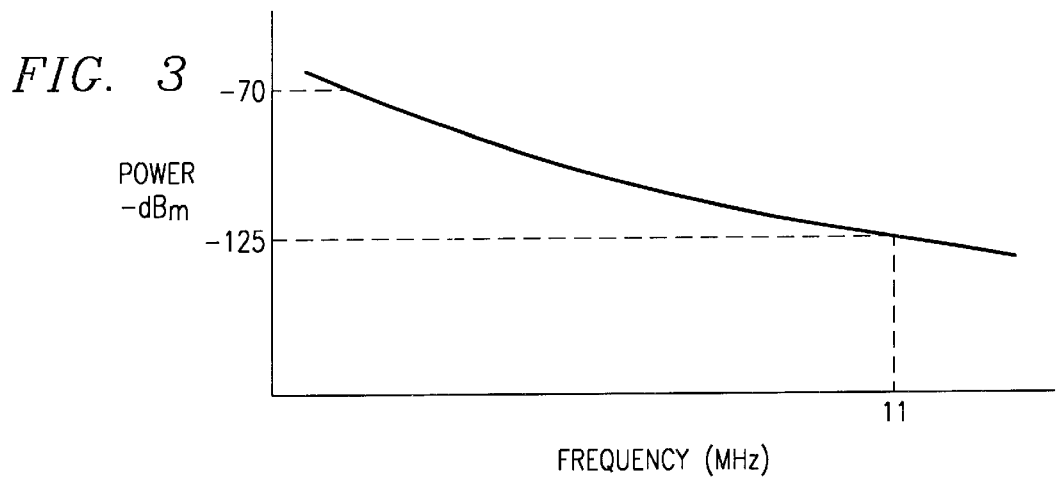
FIG. 3 is a graph illustrating the magnitude of the maximum in-tone received power at a remote unit as a function of transmission frequency in a typical VDSL application over twisted-pair transmission lines.
Figure 4:
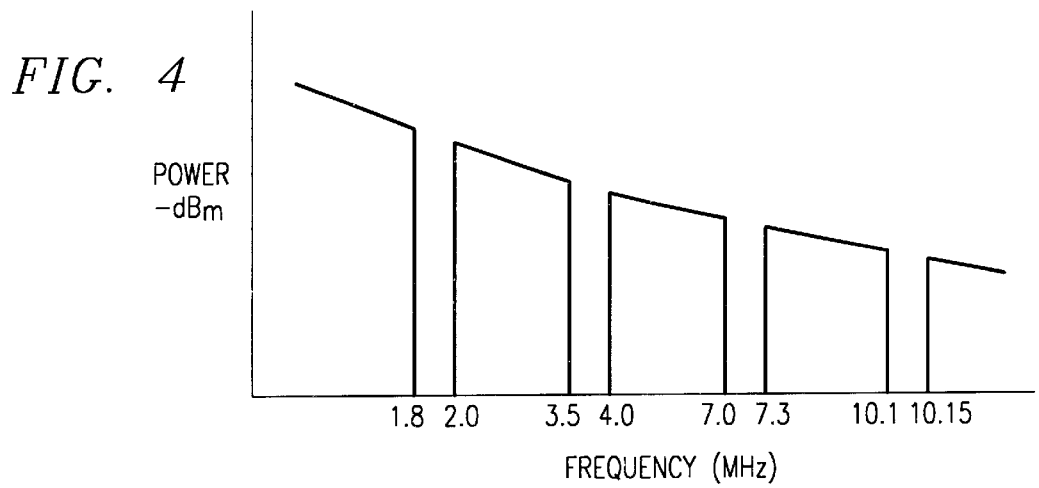
FIG. 4 is a graph illustrating the magnitude of the maximum in-tone received power at a remote unit as illustrated in FIG. 3 further taking into consideration the effects turning off the tones in restricted frequency bands.

As will be appreciated by those skilled in the art, high frequency multi-carrier signals transmitted over twisted-pair transmission lines experience significant attenuation when they are transmitted a relatively long distance over the twisted-pair lines. FIG. 3 is a graph illustrating the magnitude of the maximum in-tone received power at a remote unit (e.g., receiver) as a function of transmission frequency in a typical VDSL application over twisted-pair transmission lines. By way of example, referring to FIG. 3, when the transmit power is on the order of −60 dBm/Hz throughout the transmission bandwidth of a DNT based VDSL modulation scheme, the receive power at a typical remote user may be on the order of −70 dBm/Hz at the lower end of the frequency spectrum, but may drop to as low as −125 dBm/Hz at the higher end of the frequency spectrum. Thus, in situations where the "drop" 23 is located relatively far from the source, the downstream signals may be attenuated enough by the time they reach the "drop" 23 that they are already below the permissible power spectral density. FIG. 4 is a graph illustrating the magnitude of the maximum in-tone received power at a remote unit as illustrated in FIG. 3 further taking into consideration the effects of turning off the tones in the restricted frequency bands.

In any event, in multi-carrier transmissions schemes such as DMT, there will naturally be a number of subcarriers (tones) that fall within the restricted frequency bands. Accordingly, a first step in reducing transmissions in the restricted frequency bands is to turn off those particular subcarriers. This has the advantage of both reducing the emissions in the prohibited frequency range as well as reducing the adverse impacts associated with ingress (receipt) of the radio signals. However, as will be appreciated by those skilled in the art, it is difficult to contain the amount of power emitted for a particular tone tightly around a desired frequency center ($f_c$). Emissions associated with a particular tone typically include a relatively high power emission centered about the frequency center ($f_c$) and a number of side lobes of decreasing intensity extending on either side thereon.

The magnitude and phase of the sidelobe power can make it difficult to limit the power spectral density in a narrow range within the DMT transmission band by simply turning off the tones within the restricted frequency band. By way of example, consider a system which uses tones that are 43.125 kHz wide. If an attempt is made to form a 200 kHz wide notch in the 1.8 to 2.0 MHz range by simply turning off the tones within the 200 kHz wide prohibited range, the emission power at the center of the prohibited range would only be reduced from −60 dBm/Hz to on the order of −73 dBm/Hz. Obviously, this might result in emissions above the desired range of −70 or −85 dBm/Hz even in the center of the prohibited frequency range. Of course, the emission power at frequencies closer to the boundaries of the prohibited frequency range would be significantly higher. Thus, if an attempt is made to reduce the emissions simply by turning off a range of tones in the multi-carrier trnamissions system, the number of tones that need to be turned off would be significantly higher than the number of tones associated with a prohibited frequency range. Although the discrete multi-tone system is very flexible in its ability to pick and choose the subcarrier frequencies, the requirement of turning off such large frequency bands to avoid amateur radio interference is undedirable and may reduce system performance. Improved techniques for reducing TF emissions in restricted frequency bands are described in U.S. Application No. 08/834,500, filed Apr. 4, 1997, entitled "Mitigating Radio Frequency Interference in Discrete Multicarrier Transmission Systems, " which has been incorporated by reference.

The invention primarily concerns the ingress of RF interference (RF energy) into twisted-pair transmission lines (e.g., "drop" 23). The RF interference may be from a variety of different RF interference sources, including an amateur radio operator and AM radio stations. According to the invention, the RF interference is able to be located, estimated and cancelled from data signals being received.

Figure 5:
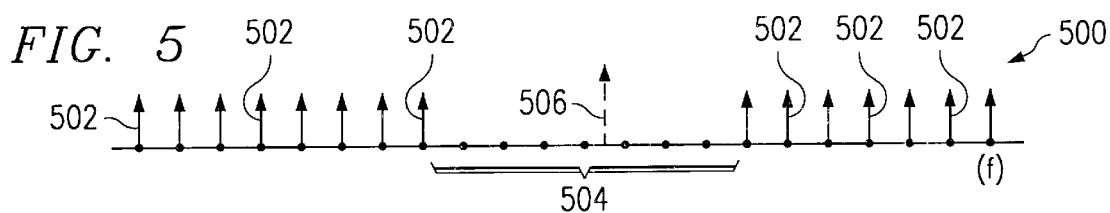
FIG. 5 is a diagram illustrating frequency tones of a multicarrier modulation system having radio interference in a restricted frequency band.

FIG. 5 is a diagram 500 illustrating frequency tones of a multicarrier modulation system having radio interference in a restricted frequency band. As an example, the multicarrier modulation system may be a Discrete Multi-Tone (DMT) modulation system. The diagram 500 is a frequency domain illustration of a plurality of tones 502 on predetermined frequencies of the multicarrier modulation system. Data information is transmitted on the tones 502. However, the frequencies over which the tones 502 are able to be transmitted often include one or more restricted frequency bands in which data should not be transmitted 504. However, radio interference is often produced in the restricted frequency band 504 because of radio transmissions by others. As an example, in the restricted frequency band 504 illustrated in FIG. 5, a radio interferer 506 transmits within the restricted frequency band 504. The radio interferer 506, for example, could be an amateur radio operator and the restricted frequency band 504 could be associated with one of the amateur radio bands previously described with respect to FIG. 4.

The multicarrier modulation system does not utilize the frequencies in the restricted frequency band 504. Hence, as illustrated in FIG. 5, the frequencies within the restricted frequency band 504 are not illustrated as carrying data as are the frequency tones 502 outside of the restricted frequency band 504. However, the presence of the radio interferer 506, even though within the restricted frequency band 504, has a detrimental effect on the frequency tones outside the restricted frequency band 504 that are carrying data. Consequently, due to the radio interferer 506, the signals on the frequency tones 502 that are carrying data are corrupted by radio interference. The amount of corruption will vary depending upon the transmitting power of the radio interferer 506 and how close the particular frequency of the tone is to the carrier frequency of the radio interferer 506.

In the example illustrated in FIG. 5, the radio interferer 506 transmits at a frequency that is contained within the restricted frequency band of the larger frequency range over which the multicarrier modulation system operates. The radio interferer could also be adjacent to the frequency range of the multicarrier modulation system. Still further, as discussed with reference to FIG. 11, the radio interferer could occur in the frequency range of the multicarrier modulation system but without regard to a restricted frequency band.

Figure 6:
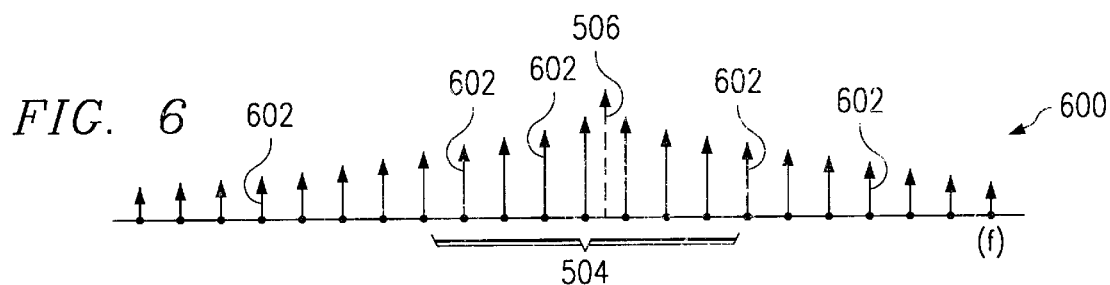
FIG. 6 is a diagram illustrating the amount of radio interference induced by a radio interferer on various frequency tones of a multicarrier modulation system.

FIG. 6 is a diagram 600 illustrating the amount of radio interference induced by the radio interferer 506 referenced in FIG. 6 on various frequency tones of a multicarrier modulation system. In this illustration, the height of the arrows on the frequency tones 602 indicate the magnitude of the radio interference induced on that frequency tone by the radio interferer 506. As can be seen from FIG. 6, the magnitude of the radio interference induced on the frequency tones 602 decreases as the frequency becomes further removed from the carrier frequency of the radio interferer 506. In order to perform radio interference cancellation, the frequency tones outside of the restricted frequency band 504 need to be corrected for the radio interference. In other words, to cancel the radio interference, the radio interference induced on the frequency tones 602 outside of the restricted frequency band 504 needs to be estimated and then subtracted from the data received on the frequency tones 602. The number of the frequency tones that are removed in frequency from the carrier frequency of the radio interferer 506 which must be corrected (to mitigate the radio interference from the radio interferer 506 on those tones carrying data) depends upon the processing techniques utilized and the degree of radio frequency mitigation desired.

Figure 7:
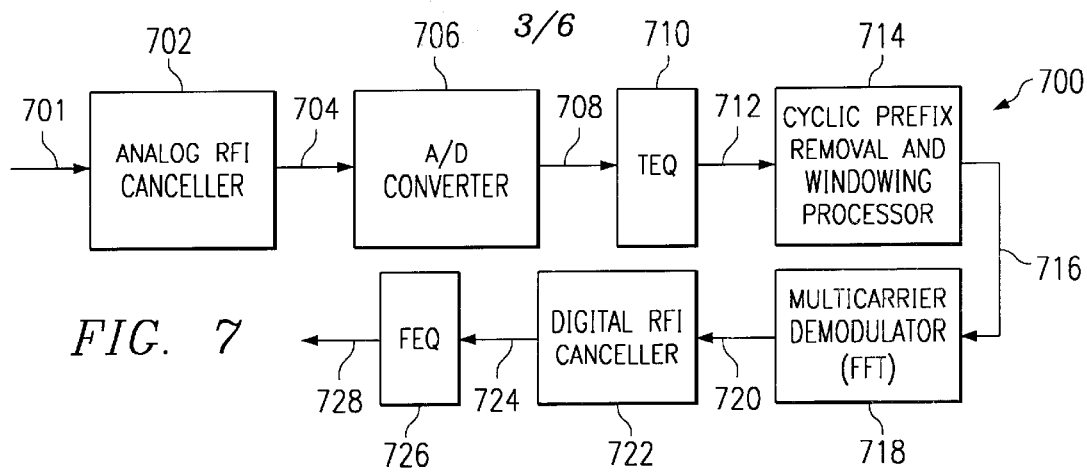
FIG. 7 is a block diagram of a receiver for a multicarrier modulation system according to an embodiment of the invention.

FIG. 7 is a block diagram of a receiver 700 for a multicarrier modulation system according to an embodiment of the invention. The receiver 700 receives radio signals 701 that have been transmitted by a multicarrier modulation system. The receiver 700 operates to process the received radio signals 701 to recover data that was transmitted by a transmitter of the multicarrier modulation system. The transmitter operates to transmit the data in blocks of data (e.g., DMT symbols). The cyclic prefix is added by the transmitter to provide a guard space to minimize inter-symbol interference and normally consists of a repetition of data from the end of a given data block.

The radio signals 701 are received by an analog radio frequency interference (RFI) canceller 702. The analog RFI canceller 702 operates to mitigate radio interference in the analog domain, and then outputs radio frequency (RF) corrected radio signals 704. One suitable analog RFI canceller is described in U.S. Application No. 08/835,073, filed Apr. 4, 1997, entitled "Radio Frequency Noise Canceller" by Cioffi et al., which adaptively estimates radio interference noise during data transmissions using information obtained when no data is actually being transmitted. The RF corrected radio signals 704 are supplied to an analog-to-digital converter 706. The correction to the radio signal 701 also ensures that the power level of the RF interference is below the saturation level for the analog-to-digital cobverter 706. The analog-to-digital converter 706 converts the RF corrected radio signals 704 to digital signals 708 which are output to a time domain equalization (TEQ) circuit 710. The time domain equalization circuit 710 produces time equalized digital signals 712. The time equalized digital signals 712 are then supplied to a cyclic prefix removal and windowing processor 714. The cyclic prefix removal and windowing processor 714 produces modified digital signals 716 which are supplied to a multicarrier demodulator 718. The processing performed by the cyclic prefic removal and windowing processor 714 is described in detail below with reference to FIG. 12. In one embodiment, the multicarrier demodulator 718 may be a Fast Fourier Transform (FFT). The TEQ circuit 710 limits the inter-symbol interference by reducing the length of the channel impulse response.

The multicarrier demodulator 718 outputs digital frequency signals 720 to a digital RFI canceller 722. Although the received radio signals 701 have already undergone RF interference cancellation by the analog RFI canceller 702, additional RF interference cancellation is often needed. For example, additional RF interference cancellation is particularly needed when a radio interferer (e.g., an amateur radio operator) is transmitting in a restricted frequency band within a frequency range of a multicarrier transmission system transmission or when AM radio broadcasting is nearby. The digital RFI canceller 722 outputs RF corrected digital signals 724 to a frequency-domain equalizer (FEQ) circuit 726. The FEQ circuit 726 outputs received digital signals 728 from which the transmitted data are obtained. The FEQ circuit 726 operates on each carrier (subchannel) and adaptively adjusts for the attenuation and phase delay of each carrier.

Figure 8A:
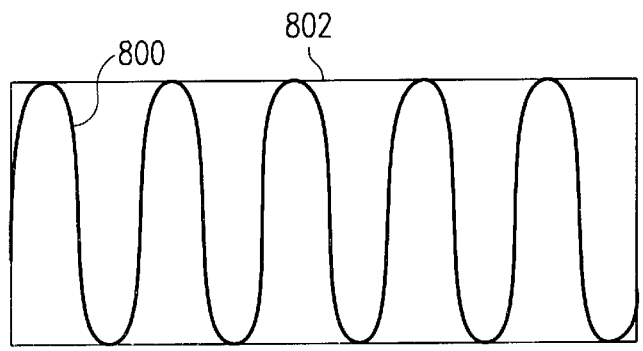
FIGS. 8A–8C are diagrams illustrating various time domain models that modulate a sinusoid.
Figure 8B:
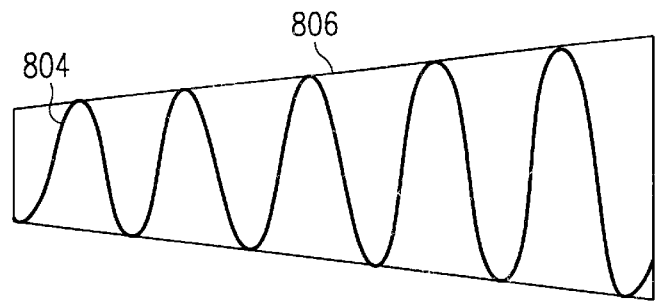
Figure 8C:
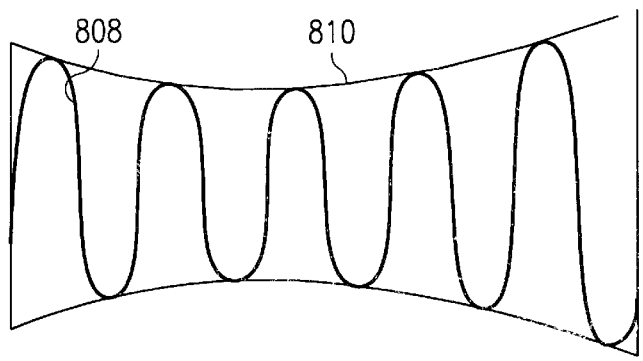

Radio interference is initially modeled as a modulated, windowed sinusoid in the time domain. FIGS. 8A–8C are representative diagrams illustrating examples of modulated sinusoids used to model radio frequency (RF) interference. The modulation of the sinusoid can take many forms as illustrated in FIGS. 8A–8C. In particular, in FIG. 8A, a time domain model modulates a sinusoid 800 using a rectangular envelope 802. In FIG. 8B, the time domain model modulates a sinusoid 804 with a linearly-varying envelope 806. In FIG. 8C, the time domain model modulates a sinusoid 808 with a (second-order) quadratically-modulated envelope 810. In general, the modulated sinusoid is modulated by an no order polynomial modulation envelope.

According to one aspect of the invention, the frequency domain model for RF interference that is utilized is derived and verified by the following discussion. For this discussion, the time domain model illustrated in FIG. 8B is used as the exemplary embodiment. The RF interference is modeled in the time domain as a sinusoid multiplied by a linearly-modulated rectangular window. More precisely, Equation (1) which follows provides the time domain model.

$$RFI(t) = rect(t)(1+at)\cos[2\pi(f_o t)+\phi] \quad (1)$$

where rect(t) is a rectangular window, $f_o$ is a carrier frequency of the radio interference, $\alpha$ is a small positive constant, and $\phi$ is a phase offset. This time domain model is equivalent to fitting a first-order polynomial to the modulation envelope of the RF interference within the time duration of a data block (e.g., DMT symbol). The time domain model is suitable so long as the bandwidth of the radio interference (i.e., radio interferer) is much less than the symbol rate of the transmission system. For example, in the case of a amateur radio operator as the radio interferer and DMT as the transmission system, the bandwidth of the radio interferer is about 2.4 MHz which is substantially less than the symbol rate of the transmission system which is about 40 MHz.

Next, this time domain model is converted into the frequency domain for RF interference cancellation in the frequency domain. A Fourier Transform of the time domain model is performed to achieve the conversion. Equation (2) which follows details the conversion to the frequency domain.

$$F\{rect(t)(1+at)\} = \left\{\frac{\sin\pi f}{\pi f} + j\frac{a}{2}\left[\frac{\cos\pi f}{\pi f} - \frac{\sin\pi f}{(\pi f)^2}\right]\right\} \quad (2)$$

The Fourier Transform of the cosine function of Equation (1) is a Dirac delta function at +f and −f. The negative frequency delta function is ignored because its contribution at the positive frequencies is minimal, particularly when non-rectangular windowing as discussed below is used. However, the positive component could be used if the data transmission system does not utilize non-rectangular windowing.

As illustrated in Equation (2), there are two terms that drop off as $1/f$ and one term that drops off as $1/f^2$. Let $f_0 = n + \delta$, where n is a frequency tone number, and $\delta$ ($0<\delta<1$) being an offset amount of the carrier frequency of the RF interference from the frequency tone n.

The resulting frequency domain model is as defined in Equation (3) which follows.

$$RFI_{n+m} = \left[\frac{A}{m-\delta} + \frac{B}{(m-\delta)^2}\right] \quad (3)$$

where $RFI_{n+m}$ is the RF interference to frequency tone m due to RF interference at a frequency $n+\delta$, where A and B are complex numbers that must be determined for each symbol.

Further, when non-rectangular windowing is also used with the frequency domain model, the effect of the windowing can be approximated by multiplication by a single complex number $W_m$ for each value of m, where $W_m$ represents the phase rotation and additional attenuation (over that of rectangular windowing) due to the non-rectangular windowing operation. The complex number $W_m$ is determined from the following Equation (4).

$$W_m = \frac{F\{win(t)\}|_{f=m}}{F\{rect(t)\}|_{f=m}} = \frac{(F\{win(t)\})_{f=m}}{\text{sinc}(m)} \quad (4)$$

where win(t) is the effective window used. Therefore, the resulting frequency domain model from Equation (3) now with non-rectangular windowing becomes as shown in Equation (5).

$$RFI_{n+m} = \left[\frac{A}{m-\delta} + \frac{B}{(m-\delta)^2}\right] W_m \quad (5)$$

where $RFI_{n+m}$ is the RF interference to frequency tone m due to RF interference at a frequency $n+\delta$, where A and B are complex numbers. Note that the frequency domain model requires that no data be transmitted on the frequency tones to either side of the frequency of the carrier frequency of the RF interference, namely frequency tones n and n+1, because these tones are used to determine values for A and B and $\delta$.

Instead of using three frequency tones to precisely determine A and B and $\delta$, the offset amount $\delta$ can be approximated by the following Equation (6). Equation (6) is precise when the RF interference is a pure sinusoid.

$$\delta = \frac{\left|Re\left\{\frac{X_{n+1}}{W_1}\right\}\right| + \left|Im\left\{\frac{X_{n+1}}{W_1}\right\}\right|}{\left|Re\left\{\frac{X_{n+1}}{W_1}\right\}\right| + \left|Im\left\{\frac{X_{n+1}}{W_1}\right\}\right| + \left|Re\left\{\frac{X_n}{W_0}\right\}\right| + \left|Im\left\{\frac{X_n}{W_0}\right\}\right|} \quad (6)$$

where $X_i$ represents the samples values for the frequency domain tones. The offset amount $\delta$ is thus approximately equal to $|X_{n-1}|/\{|X_n|+|X_{n+1}|\}$, which is accurate enough for estimating RF interference from an amateur radio operator. The frequency domain model has shown to be rather insensitive to small errors in the offset amount $\delta$.

Then, using Equation (5) for tones n and n+1, two equations (Equations 7 and 8) can be written.

$$\frac{X_n}{W_0} = -\frac{A}{\delta} + \frac{B}{\delta^2} \quad (7)$$

$$\frac{X_{n+1}}{W_1} = \frac{A}{1-\delta} + \frac{B}{(1-\delta)^2} \quad (8)$$

Simultaneously solving these two equations provides a technique to determine the complex parameters A and B of the frequency domain model. The complex parameters A and B are thus determined by the following equation.

$$\begin{bmatrix} A \\ B \end{bmatrix} = \begin{bmatrix} -1 & 1 \\ 1-\delta & \delta \end{bmatrix} \begin{bmatrix} \delta^2 \frac{X_n}{W_0} \\ (1-\delta)^2 \frac{X_{n+1}}{W_1} \end{bmatrix} \quad (9)$$

The complex parameters A and B are determined, at each symbol, for each RF interferer, the $W_m$ is a function of the windowing and varies with each of the frequency tones, and the offset amount $\delta$ is computed once per symbol for each RF interferer being modeled. More generally, as noted above, $\delta$, A and B could be determined by simultaneously solving three equations obtained from Equation (5) for three different tones (e.g., n, n+1 and n+2), provided data is not transmitted on these tones. Alternatively, the system could determine $\delta$ as given by Equation (6) when the RF interference is first detected, and then again use Equation (6) to average over many symbols to provide an estimate that becomes more accurate as the number of symbols averaged over increases.

In one embodiment, the frequency domain model provides sufficiently accurate modeling of the RF interference that only the model parameter A, as computed in Equation (9), is used for cancellation, while the model parameter B is assumed to be zero. With this simplification to the frequency domain model, the complexity is reduced, yet the frequency domain model still provides sufficient accuracy in modeling the RF interference in many cases. As an example, for RF interference caused by amateur radio operators, this simplification has shown to still provide sufficiently accurate modeling (such as in a VDSL system). In other cases, the simplification may not be appropriate and the model parameter B should also be utilized, such as with higher bandwidth signals like AM radio signals.

Furthermore, higher order models could be likewise used to provide an even more accurate model for the RF interference. However, the higher the order of the models used, the greater the processing requirements to compute the parameters for the model. Hence, more generally, the frequency domain model of Equation (3) according to the invention is in accordance with the following equation:

$$RFI_{n+m} = \left[\sum_{k=1}^{MO+1} \frac{A_k}{(m-\delta)^k}\right] \quad (10)$$

where $RFI_{n+m}$ is the RF interference at a frequency tone m due to a radio interferer at frequency n, $\delta$ is an offset amount, MO is a model order for the frequency domain model, and $\{A_k\}$ are complex numbers that are determined at each symbol for each interferer. Hence, the frequency domain model derived above and defined by Equation (3) is a first order model (MO=1). Of course, when non-rectangular windowing is also used with the frequency domain model, the effect of the windowing can be approximated by multiplication by a single complex number $W_m$ for each value of m, as was done in Equation (5).

FIG. 9 is a diagram of basic radio frequency (RF) cancellation processing 900 according to a basic embodiment of the invention. The RF cancellation processing 900 is preferably performed by a receiver or receiver portion of a transceiver of a multicarrier modulation system.

The RF cancellation processing 900 initially receives 902 frequency domain data. The frequency domain data is data that has been transmitted by a transmitter of the multicarrier modulation system over a transmission media to a receiver. Next, a restricted frequency band having radio frequency (RE) interference is identified 904. Then, assuming that a restricted frequency band has been identified as containing RF interference, the frequency of the RF interference within the restricted frequency band is estimated 906. After estimating the frequency for the RF interference, the RF interference is estimated 908 in accordance with the estimated frequency and a frequency domain model for the RF interference. Thereafter, the estimated RF interference is removed 910 from the frequency domain data. Following block 910, the RB cancellation processing 900 is complete and ends.

Figure 10B:
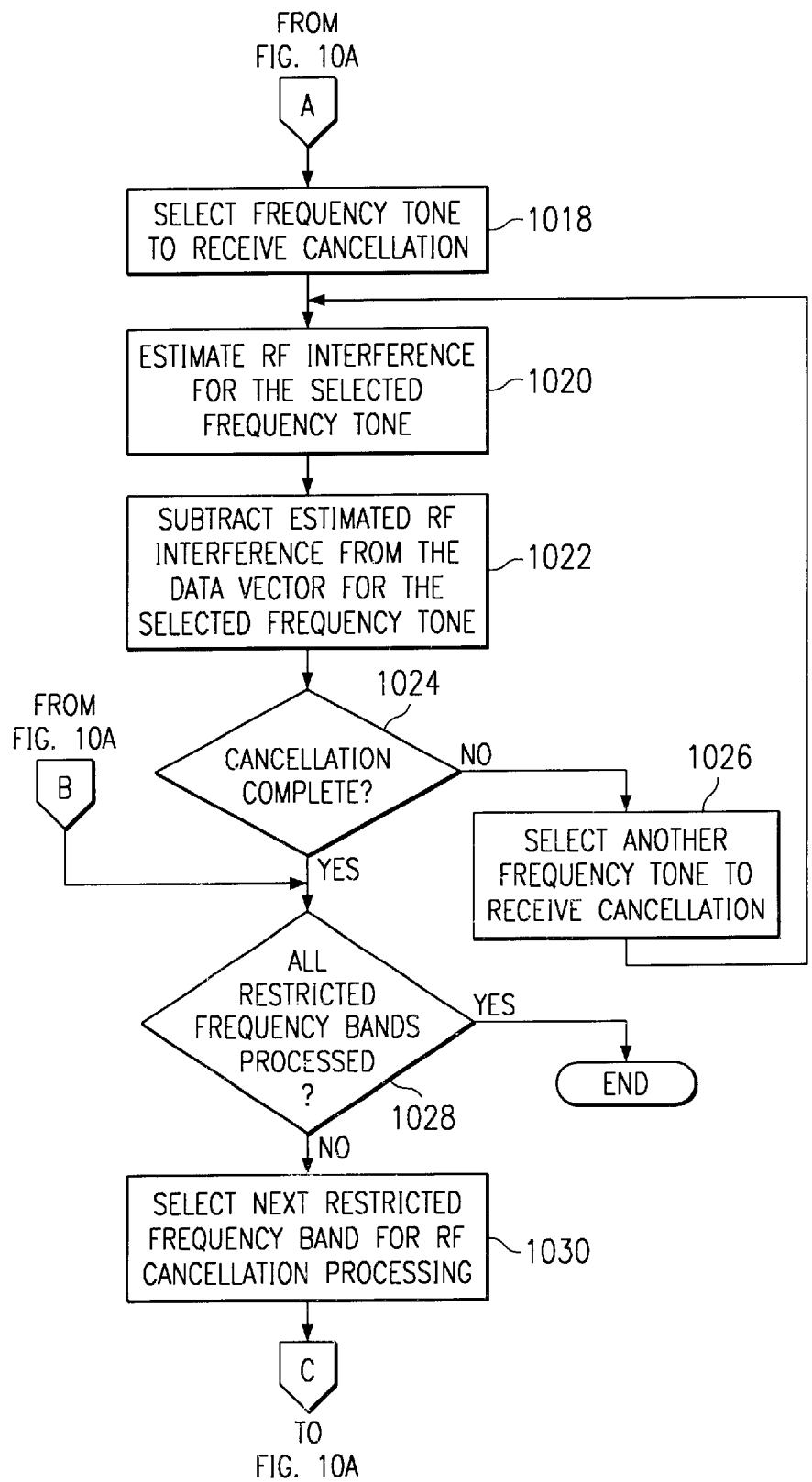

FIGS. 10A and 10B are flow diagrams of digital RF cancellation processing 1000 according to an embodiment of the invention. It should be noted that the digital RF cancellation processing 1000 is associated with the processing performed by a receiver or receiver portion of a transceiver of a multicarrier modulation system upon receiving each symbol of a multicarrier transmission system.

The digital RF cancellation processing 1000 initially receives 1002 data vectors $X_i$ for a symbol. The data vectors $X_i$ are typically complex numbers for each of the frequency tones within a symbol. For example, in a 256-carrier DMT system, a data point $X_i$ would be received for each of 256 frequency tones.

Next, a restricted frequency band for RF cancellation processing is selected 1004. When there are multiple restricted frequency bands within the transmission frequency range of the multicarrier transmission system, the processing described below is repeated for each of the restricted frequency bands. In any event, one of the restricted frequency bands is selected for RF cancellation processing in which RF interference produced in the restricted frequency band is cancelled from the received data vectors $X_i$. The RF cancellation processing 1000 is described assuming at most one RF interferer is present in each of the restricted frequency bands.

Within the restricted frequency band that has been selected 1004, the largest data vector $|X_i|_L$ within the restricted frequency band is determined 1006. Next, a decision block 1008 determines whether the largest data vector $|X_i|_L$ within the restricted frequency band is greater than a threshold. The value of the threshold will vary with system design but is normally set to a level such that a data vector $|X_i|$ in the restricted frequency band that is about 20 dB above the noise floor will exceed the threshold. When the largest data vector $|X_i|_L$ is greater than the threshold, then the processing for the selected restricted frequency band continues.

Next, a largest adjacent data vector $|X_i|_{LA}$ is determined 1010. Then, data vectors $X_n$ and $X_{n+1}$ are selected 1012 from the largest data vector $|X_i|_L$ and the largest adjacent data vector $|X_i|_{LA}$. The value of n provides an indication of an estimated frequency of the RF interference within the restricted frequency band because the received data vectors for the frequencies within the restricted frequency band do not carry information. In effect, at this point in the digital RF cancellation processing 1000, the carrier frequency of the RF interference is generally estimated to be between frequencies associated with n and n+1.

Next, an offset amount δ is determined 1014 from the selected data vectors $X_n$ and $X_{n+1}$. For example, the offset amount δ can be determined with Equation (6) with $W_0 \approx 1$ and $W_1$ pre-stored in memory. Then, for the frequency domain model for the RF interference that has been selected (e.g., Equation (3)), model parameters A and B are computed 1016. As an example, Equation (9) can be used to determine the model parameters A and B. Once δ, A and B have been determined, the frequency domain model for the RF interference is completed and may be used to cancel the RF interference from the received data vectors.

A frequency tone is selected 1018 to receive cancellation. As previously noted, a predetermined number of the frequency tones that are adjacent to the restricted frequency band having the RF interference are selected such that they may be processed to cancel out the RF interference. Although the canceling could be performed on all the frequency tones, it is computationally advantageous to perform cancellation only on a predetermined number of adjacent frequency tones. In any event, the selection 1018 of the frequency tone to receive cancellation operates to select one of these adjacent frequency tones. Then, for the selected frequency tone, the RF interference is estimated 1020 using the frequency domain model. Next, the estimated RF interference is subtracted 1022 from the data vector for the selected frequency tone. The subtraction performs the cancellation as illustrated in the following equation:

$$X_{n+m}(\text{cancelled}) = X_{n+m}(\text{uncancelled}) - RFI_{n+m}$$

where $RFI_{n+m}$ is obtained from Equation (10).

A decision block 1024 then determines whether cancellation of the RF interference has been completed. The decision block 1024 determines whether all of the frequency tones adjacent to the restricted frequency band having the RF interference that require cancellation (e.g., the predetermined number) have received the necessary cancellation processing. Hence, if the cancellation has not been completed for all of the frequency tones to receive cancellation, the digital RF cancellation processing 1000 operates to select 1026 another frequency tone to receive cancellation. Following block 1026, the digital RF cancellation processing 1000 returns to repeat block 1020 and subsequent blocks for the newly selected frequency tone. Note that for the newly selected frequency tone, the RF interference is again estimated for this newly selected frequency tone.

On the other hand, when a decision block 1024 determines that the cancellation for the frequency tones has been completed, a decision block 1028 determines whether all of the restricted frequency bands have been processed. When all of the restricted frequency bands have not been processed, the next restricted frequency band is selected 1030 for RF cancellation processing. Following block 1030, the digital RF cancellation processing 1000 returns to repeat block 1006 and subsequent blocks so as to cancel RF interference in other restricted frequency bands. Alternatively, when the decision block 1028 determines that all of the restricted frequency bands have been processed, the digital RF cancellation processing 1000 is complete and ends.

Further, when the decision block 1008 determines that the largest data vector $|X_i|_L$ does not exceed the threshold, then the processing for canceling RF interference within the particular restricted frequency band is bypassed, and therefore not performed. In this case, the decision block 1008 causes the digital RF cancellation processing 1000 to jump to the decision block 1028 and thus bypass blocks 1010 through 1026.

In one implementation of the digital RF cancellation processing 1000, for a VDSL system, the processing is implemented by a digital ASIC coupled to or integrated with random access memory (RANM) and read only memory (ROM). The predetermined number of adjacent tones to receive RF interference cancellation is 31 tones on each side of the RF interferer (neglecting tones n and n+1), though the RF interference on the tones within the restricted frequency band need not be cancelled. In the case where the model order (MO) is one and B is assumed equal to zero, the $1/(m-\delta)$ term in the frequency domain model for the RF interference can be computed using a first order polynomial approximation to avoid having to perform time-consuming divide operations. The coefficients $a_0$ and $a_1$ for the polynomial approximation are stored in memory for each value of m (a set for $0<\delta<0.5$ and a set for $0.5<\delta<1$) and can thus be rapidly retrieved. The complex number $W_m$ is also preferably 24-bits and stored in RAM. The data vectors for the frequency tones undergoing RF interference cancellation are preferably frequency domain data samples output from a FFT. Each of the restricted frequency bands can have its own threshold value.

Preferably, the computations for estimating the RF interference can be performed as follows. The largest element in the frequency band, and the largest element to either side of the largest element, are $X_n$ and $X_{n+1}$. Next, intermediate values $\alpha$, and $\beta$ are computed as follows.

$$\alpha = \frac{1}{2}X_{n+1}\left(\frac{1}{W_1}\right)$$

$$\beta = \frac{1}{2}X_n$$

where $1/W_1$ is held in RAM, and where $W_0 \approx 1$. Then, intermediate values a and b are computed as follows.

$$a = \frac{|Re\{a\}|}{4} + \frac{|Im\{a\}|}{4}$$

$$b = a + \frac{|Re\{\beta\}|}{4} + \frac{|Im\{\beta\}|}{4}$$

The scaling down by a factor of 2 is done to prevent overflow during addition. The numbers a and b are then shifted such that $0.5<b<1$. Newton's method with eight iterations (I=0:7) is then used to find $\delta=a/b$. Set $\delta_0=0.5$, and then $$\delta_{i+1} + \delta_i - (\delta_i b - a)$$

The model parameter A (as scaled by a factor of 2) is then determined by the following equation.

$$A/2 = -\delta^2\beta + (1-\delta)^2\alpha$$

The estimate of the RF interference for tone m is computed by forming $$r1 = \delta a_0 + a_1$$

$$r2 = AW_m$$

and thus the estimate of the RF interference becomes $$RFI_{n+m} = 2(r1)(r2).$$

The estimated RF interference is computed is then subtracted from the data for the predetermined number of adjacent tones of the symbol (e.g., m=−31:32).

FIG. 11 is a flow diagram of AM radio frequency (RF) cancellation processing 1100 according to an embodiment of the invention. AM radio transmissions also cause RF interference to radio transmissions by a multicarrier modulation system. Unlike RF interference due to amateur radio operators, the AM RF interference is typically steadily present as AM radio stations tend to transmit 24 hours a day. The AM RF cancellation processing 100 is preferably performed by a receiver or receiver portion of a transceiver of a multicarrier modulation system. The modeling of the RF interference described above equally applies to AM RF interference. For example, a first order model for the frequency domain model (e.g., Equation (5)) is also suitable for modeling AM RF interference at VDSL rates.

The AM RF cancellation processing 1100 initially identifies 1102 AM RF interference during an initialization period in which no data is being transmitted. Then, the frequency of the AM RF interference is estimated 1104. For example, by measuring the data signals received during the initialization period in which no data is being transmitted (as often the case with multicarrier modulation systems), the magnitude of the AM RF interference measured at different frequencies is found. Then, in this example, the areas in which the magnitude is maximized indicates a general location of the carrier frequency for the AM RF interference. Thereafter, in this example, the system can average the determined carrier frequencies over a period of time (e.g., many data blocks) to accurately determine the carrier frequency for the AM RF interference. By averaging the results of $|X_{n+1}|+/\{|X_n|+|X_{n+1}|\}$ (or using Equation (6)) during the initialization period, the offset amount $\delta$ is able to be accurately determined and thus identifies the carrier frequency for the AM RF interference. Once the carrier frequency for the AM RF interference is estimated 1104, the initialization is complete for this portion the AM RF cancellation processing 1100. Generally, the AM cancellation assumes that larger AM interferers are not close together in the AM frequency band.

Thereafter when data is subsequently being transmitted or received, the AM RF cancellation processing 1100 further operates to cancel the AM RB interference from the data signals being received. In the case of data transmission, the frequency tones adjacent to the estimated frequency of the AM RF interference are disabled 1106 so that no data is transmitted thereon. Here, at least the two frequency tones adjacent to the estimated frequency of the AM RF interference are disabled 1106 because the RF model uses these tones in modeling the RF interference.

The cancellation of the AM RF interference by the AM RF cancellation processing 1100 is then as follows. The AM RF interference is estimated 1108 in accordance with the estimated frequency and a frequency domain model for the AM RF interference. Thereafter, the estimated AM RF interference is removed 1110 from the frequency domain data. Following block 1110, the RB cancellation processing 900 is complete and ends.

Non-rectangular windowing is generally known to reduce sidelobe levels in multicarrier modulation systems. See, e.g., Spruyt, Reusens and Braet, "Performance of improved DMT transceiver for VDSL, Alcatel Telecom T1E1.4 Submission, Apr. 22–25, 1996. The non-rectangular windowing described by Spruyt et al. extends beyond the boundary of a symbol into a cyclic prefix and a cyclic suffix of the symbol.

The frequency domain model discussed above preferably uses extended, non-rectangular windowing to cause sidelobes to attenuate faster so that the RB interference affects less frequency tones. The particular type of non-rectangular windowing used can vary. FIG. 12 describes a possibly preferred type of non-rectangular windowing that is also another aspect of the invention that is useful not only with the RF cancellation techniques described herein but also by itself for mitigating intercarrier interference in general.

FIG. 12 is a flow diagram of prefix removal and windowing processing 1200 according to an embodiment of the invention. Here, the windowing preferably performed is non-rectangular, extended windowing. The non-rectangular windowing acts to cause the sidelobes of the frequency tones to attenuate faster than rectangular windowing. The extended windowing means that the window width extends beyond the data symbol itself into a cyclic prefix. The cyclic prefix normally consists of a repetition of data from the end of the corresponding data symbol. The cyclic prefix is a guard band that provides a guard time to reduce the intersymbol interference caused because channel responses are not ideal. As one example, in VDSL, the data symbol might have 512 samples and 40 samples of cyclic prefix. The prefix removal and windowing processing 1200 is preferably performed by the cyclic prefix removal and windowing processor 714 illustrated in FIG. 7.

The prefix removal and windowing processing 1200 initially receives 1202 X-samples of a DMT symbol and Y-samples of its cyclic prefix. For example, 512 samples of a DMT symbol and 40 samples of a cyclic prefix may make up a DMT symbol. FIG. 13 is a diagram illustrating a 512 sample DMT symbol 1300 (samples 40–551) with a 40 sample prefix 1302 (samples 0–39), and a non-rectangular, extended window. In FIG. 13, the non-rectangular, extended windowing extends from sample 20 to sample 551, with samples 20–39 being that portion that extends into the cyclic prefix. The processing of the X-samples of the DMT symbol and the Y-samples of the cyclic prefix are processed as follows.

An initial portion of the Y-samples of the cyclic prefix are dropped 1204 because they are no longer needed. A remaining portion of the Y-samples are retained 1206 for later retrieval. The size of the remaining portion of the Y-samples depends on the amount of extended windowing being used. For example, with a 40 sample cyclic prefix, the size of the remaining portion of the 40-samples could by any whole number between 0 and 40. Next, a first portion of the X-samples of the DMT symbol are retained 1208. Then, a second portion of the X-samples of the DMT symbol are modified 1210 in accordance with the retained samples of the remaining portion of the cyclic prefix and predetermined multiplication coefficients. Following block 1210, the prefix removing and windowing processing 1200 is complete and ends.

According to the prefix removal and windowing processing 1200, the DMT symbol and its prefix have been processed such that the resulting samples have been filtered such that an initial group of samples of the prefix are removed and then extended non-rectangular windowing processing is performed on the remaining samples. The extended non-rectangular windowing operates to multiply the samples of the remaining portion of the cyclic prefix by a raised-cosine-function (or other smoothing function) representing the non-rectangular portion of the window, and then combines the resulting value into the samples of the second portion of the X-samples. The advantage of the extended non-rectangular windowing operation is that the effective sidelobe levels data attenuate faster which is generally advantageous in a multicarrier modulation system. In the case where the extended non-rectangular windowing is used with the RF cancellation techniques according to the invention, the advantage of the extended non-rectangular windowing is that RF cancellation can be performed on fewer adjacent frequency tones which reduces processing needed to compensate for the RF interference. The saved processing time which can be important in high-speed systems such as multicarrier modulation systems (e.g., VDSL). The extended non-rectangular windowing according to the invention further reduces the computational burden required to implement the extended, non-rectangular windowing. The following examples helps to explain the additional computational savings offered by this aspect of the invention.

An example of the prefix removal and windowing processing 1200 is explain for a case where 32-sample extended windowing is utilized with 512 DMT frequency tones and 40-samples of cyclic prefix. The values $x_0$ through $x_{551}$ represent a single DMT symbol with its cyclic prefix, and the values $w_0$ through $W_{31}$ are window taps that are preferably stored in RAM. In this example, the prefix removal and windowing processing 1200 is as follows:

Discard $x_0$ through $x_7$
Store $x_i$ for i=8 to 39
$x_i = x_i$ for i=40 to 519
Form $x_{520+i} = x_{520+i} + (x_{8+i} - x_{520+i})w_i$, for i=0 to 31.
Note that $x_{520+i} = (1-w_i)x_{520+i} + w_i x_{8+i} = x_{520+i} + (x_{8+i} - x_{520+i})w_i$, and the implementation requires 32 real multiply operations and 64 addition operations per DMT symbol. In contrast, the conventional approach would utilize 64 real multiply operations and 32 or 64 addition operations per DMT symbol. Given that the computational burden to perform a multiply operation is significantly greater than the computational burden for an addition operation, the ability of the invention to save 32 multiply operations is noteworthy.

It should be understood that the present invention may be embodied in many forms and modulation schemes (e.g., Discrete Wavelet Multi-tone Modulation (DWE)) at both the central and remote station locations without departing from the spirit or scope of the invention. For instance, although the specification has primarily described the invention in the context of subscriber line based high speed data transmission systems, the invention may be used in other systems which experience significant narrow band interference or have restricted frequency bands of RF interference within their designated transmission bands.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:
What is claimed is:

1. A method for mitigating radio frequency interference in a multicarrier modulation system, said comprising the operations of:
   prior to data transmission,
      identifying AM radio interference in the multicarrier modulation system;
      estimating a frequency of the AM radio interference;
      disabling certain frequency tones of the multicarrier modulation system adjacent to the estimated frequency of the AM radio interference from carrying frequency domain data during the data transmission;
   thereafter, during or following data reception,
      estimating the AM radio interference in accordance with a frequency domain model for the AM radio interference and the estimated frequency of the AM radio interference; and
      removing the estimated AM radio interference from the frequency domain data.

2. A method as recited in claim 1, wherein said identifying of the AM radio interference is performed during an initialization period of the multicarrier modulation system that occurs prior to data transmission.

3. A method as recited in claim 1, wherein the frequency domain data contains a plurality of frequency domain data samples, and
wherein the frequency domain data is initially received as time domain data, the time domain data undergoes a time domain windowing operation, and thereafter the windowed time domain data is converted to the frequency domain.

4. A method as recited in claim 1, wherein the AM radio interference resides within a AM radio band,
wherein the frequency domain data contains a plurality of frequency domain data samples, and
wherein said estimating of the frequency of the AM radio interference comprises the operations of:
determining a largest data sample of the frequency domain data samples within a frequency range, and determining a largest adjacent data sample that is adjacent to the largest data sample; and
determining the frequency of the AM radio interference within the frequency range based on the largest data sample and the largest adjacent data sample in a portion of the radio band.

5. A method as recited in claim 4, wherein the frequency domain model is based on a time domain model for the RF interference in which the RF interference is modeled as a windowed, modulated sinusoid.

6. A method as recited in claim 5, wherein the sinusoid is modulated by a windowed, modulation envelope.

7. A method as recited in claim 5, wherein the modulated is modulated by a linearly-varying, windowed, modulation envelope.

8. A method as recited in claim 5, wherein the sinusoid is modulated by an $n^{th}$ order polynomial modulation envelope.

9. A method as recited in claim 1, wherein the frequency domain data contains a plurality of frequency domain data samples,
wherein said estimating the AM radio interference estimates the AM radio interference for at least a portion of the frequency domain data samples, and
wherein said removing of the estimated AM radio interference from the frequency domain data comprises, for each of the frequency domain data samples in the portion, the operation of subtracting from the frequency domain data sample the estimated AM radio interference on that frequency domain data sample.

10. A method as recited in claim 9, wherein the AM radio interference resides within a AM radio band,
wherein the frequency domain data contains a plurality of frequency domain data samples, and
wherein said estimating of the frequency of the AM radio interference comprises the operations of:
determining first and second largest data samples of the frequency domain data samples within the portion of the frequency domain data samples; and
determining the frequency of the AM radio interference based on the first and second largest data samples in a portion of the radio band.

11. A method as recited in claim 10, wherein the frequency domain model is based on a time domain model for the AM radio interference in which the AM radio interference is modeled as a modulated sinusoid.

12. A method as recited in claim 11, wherein the AM radio interference is due to radio broadcasts by radio stations.

13. A method as recited in claim 11, wherein the frequency domain data is provided in a plurality of frequency tones, and
wherein the frequency domain model is produced in accordance with the following equation:

$$RFI_{n+m} = \left[ \frac{A}{m-\delta} + \frac{B}{(m-\delta)^2} \right] W_m.$$

where $RFI_{n+m}$ is the RF interference at a frequency tone n+m due to a radio interferer at frequency (n+δ), δ is an offset amount, $W_m$ is an attenuation factor due to time domain windowing and varies with each of the frequency tones, and A and B are complex numbers.

14. A method as recited in claim 13, wherein A and B are model parameters and are determined by the following equation:

$$\begin{bmatrix} A \\ B \end{bmatrix} = \begin{bmatrix} -1 & 1 \\ 1-\delta & \delta \end{bmatrix} \begin{bmatrix} \delta^2 \frac{X_n}{W_0} \\ (1-\delta)^2 \frac{W_{n+1}}{W_1} \end{bmatrix}$$

where the complex parameters A and B are determined once for each symbol, and the offset amount δ is computed once per symbol for each RF interferer being modeled.

15. A method as recited in claim 1, wherein the frequency domain data contains a plurality of frequency domain data samples,
wherein said method further comprises the operation of comparing the frequency domain data samples with a threshold amount, and
wherein at least one of said estimating the AM radio interference and said removing of the estimated AM radio interference are bypassed when said comparing determines that the frequency domain data samples are less than the threshold amount.

16. A method as recited in claim 1, wherein said estimating of the AM radio interference further being in accordance with the frequency domain data on the certain frequency tones on which no data, just AM radio interference, is present.

17. A method as recited in claim 1, wherein said estimating of the frequency of the AM radio interference is performed while data is not being transmitted.

18. A method as recited in claim 1, wherein the frequency domain data is provided in a plurality of frequency tones, and
wherein the frequency domain model is produced in accordance with the following equation:

$$RFI_{n+m} = \left[ \sum_{k=1}^{MO+1} \frac{A_k}{(m-\delta)^k} \right]$$

where $RFI_{n+m}$ is the RF interference at a frequency tone n+m due to a radio interferer at frequency (n+δ), δ is an offset amount, MO is a model order for the frequency domain model, and $A_k$ is a complex number.

* * * * *